United States Patent [19]

Heberle

[11] Patent Number: 5,023,943

[45] Date of Patent: Jun. 11, 1991

[54] ELECTROOPTICAL POINTING DEVICE FOR REMOTELY CONTROLLING ELECTRONIC APPARATUS

[75] Inventor: Klaus Heberle, Reute, Fed. Rep. of Germany

[73] Assignee: Deutsche ITT Industries GmbH, Freiburg, Fed. Rep. of Germany

[21] Appl. No.: 450,971

[22] Filed: Dec. 15, 1989

[30] Foreign Application Priority Data

Dec. 31, 1988 [EP] European Pat. Off. ........ 88121922.4

[51] Int. Cl.[5] .......................... G08F 1/00; H04H 1/00
[52] U.S. Cl. ........................................ 455/603; 455/4; 455/609; 455/617; 455/618
[58] Field of Search .................... 455/603, 618, 617, 4, 455/609, 619; 358/210; 340/706, 709

[56] References Cited

U.S. PATENT DOCUMENTS 4,565,999  1/1986  King et al. ........................ 340/706
4,745,402  5/1988  Auerbach ........................... 340/709

Primary Examiner—Joseph A. Orsino
Assistant Examiner—Franklin V. Nguyen
Attorney, Agent, or Firm—Thomas L. Peterson

[57] ABSTRACT

In an electrooptical arrangement for remotely controlling an electronic apparatus with a remote control transmitter, the transmitter is formed with three sources of radiation whose radiation patterns are different from each other and can be comparatively detected relative to each other to indicate the tilting of the transmitter in different reference plane directions. A radiation detector at the receiver side detects the different radiation intensities for the signals from the three sources, and the relation between the signal intensities is evaluated to determine the tilt angles of the remote control transmitter in the reference plane directions.

11 Claims, 2 Drawing Sheets

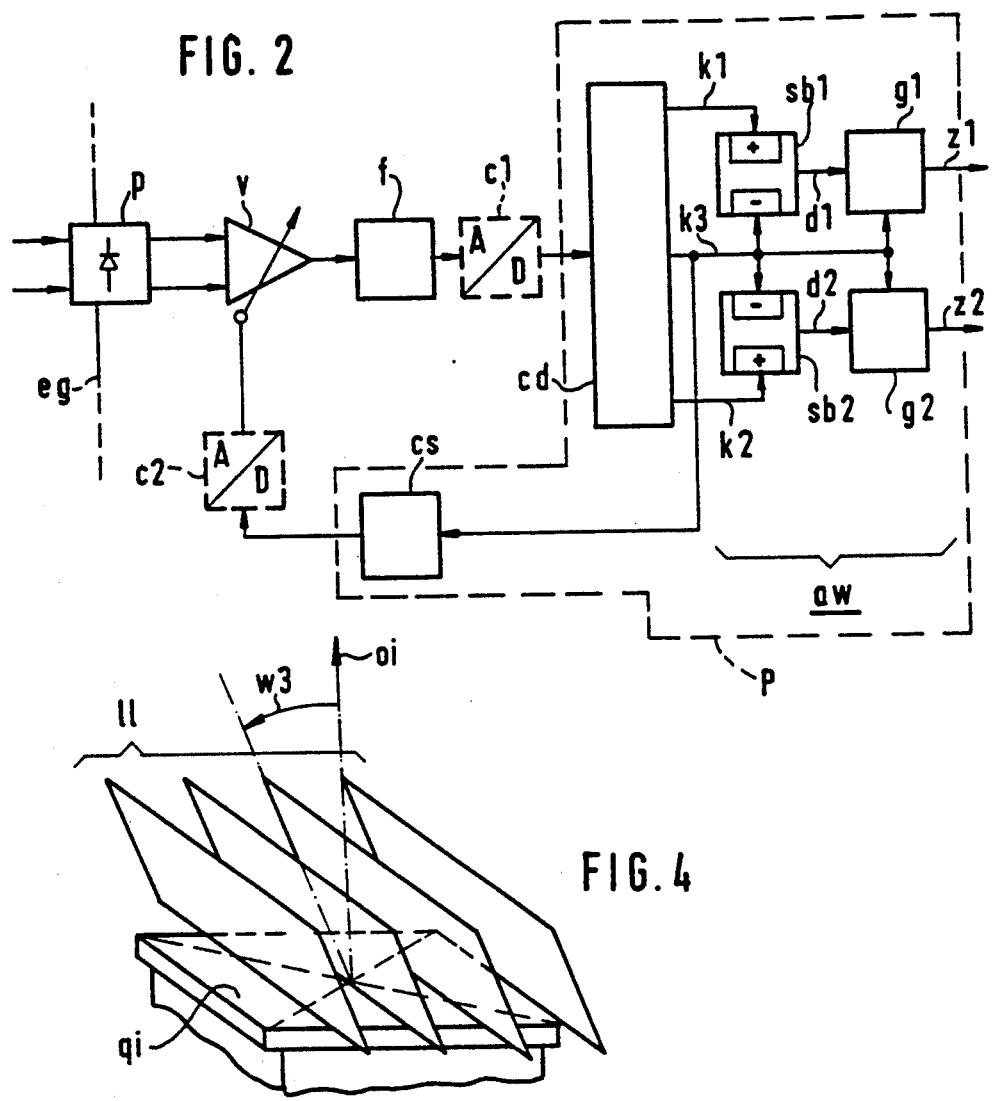
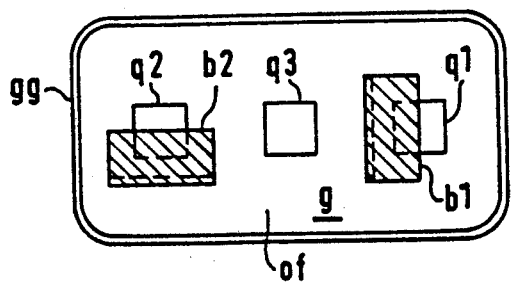
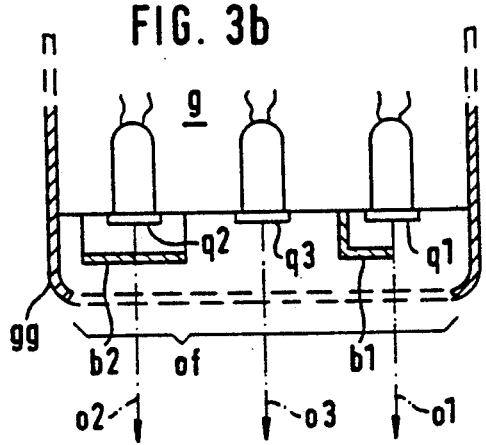

ELECTROOPTICAL POINTING DEVICE FOR REMOTELY CONTROLLING ELECTRONIC APPARATUS

FIELD OF INVENTION

The present invention relates to an electrooptical arrangement for controlling electronic apparatus, and particularly to one having a remote control pointer device having signal-emitting sources for transmission of a modulated or coded ultrasonic or infrared signals to the electronic apparatus.

BACKGROUND OF INVENTION

Electronic apparatus which is remotely controllable, particularly entertainment electronic apparatus, is growing in popularity. Such entertainment electronic apparatus includes mainly television sets, video recorders, audio equipment, and the like. Remote-control devices are also used to control personal computers, garage door openers, roller blinds, and the like. Typically, remote control signals for the apparatus to be controlled are generated in response to the depression of keys on a remote control unit by the user and are transmitted to and decoded by a sensor circuit of the electronic apparatus.

Greater numbers of functions are continually being developed to control a single apparatus, e.g., a television which receives teletext in addition to the various television channels and which may be connected to a video recorder. Greater numbers of control commands are correspondingly required and necessitate an increased number of keys on the remote control unit. A reduction of the numbers of keys is possible by multiple key assignments or multiple key presses, however, the operation of the unit becomes correspondingly more complicated. A drastic reduction of the numbers of keys is not possible in this manner.

One solution to this problem is to provide interactive communication with the apparatus to be controlled, as is commonly used with computers. For example, the operator may be offered a "menu" of possible control commands via a display screen for the apparatus, and then chooses the desired command via a keyboard or a pointer device such as a "mouse". Movement of the position of the mouse on a surface results in an input of signals which determines the position of a cursor displayed on the display screen.

However, a mouse or other conventional pointer device requires cable attachment to the electronic apparatus or proximity of the operator to the display screen. In many situations, it is desireable to have a pointer device which is not attached to the apparatus and can be carried by the operator as a remote control unit. Remote control pointers are known which have a transmitter for emitting an ultrasonic or infrared signal which is received by the apparatus to be controlled. The amplitude and/or phase of the transmitted signal detected by a sensor of the apparatus varies depending upon the angular orientation of the pointer relative to its reference axis, and thereby the angular orientation of the pointer can be converted to position coordinates for a cursor on the display screen or to higher/lower, up/-down, or left/right command signals for the apparatus to be controlled.

For example, as disclosed in U.S. Pat. No. 4,565,999, issued Jan. 21, 1986, to King et al., a "light-pencil" worn on the operator's head has a cluster of four LEDs with their principal axes uniformly diverging in horizontal and vertical directions from a central reference axis. The LEDs emit the same pulsed radiation pattern in timed sequence along their respective individual axes partially overlapping each other. The amplitude (intensity) of each signal at a sensor (phototransistor) on the reference axis varies with the angular orientation of the LED axis. Corresponding X and Y coordinates are computed based upon the relative amplitudes of the pointing signals with respect to its opposite pair in the horizontal and vertical directions. However, this arrangement has the problem that use of the device at varying distances from the apparatus encounters difficulty in preserving the amplitude proportionality of the signal samples, as well as places linearity and stability constraints on the receiver circuitry.

A modified remote control pointer device is disclosed in U.S. Pat. No. 4,745,402, issued May 17, 1988, to Auerbach. The pointer array has eight LEDs arranged symmetrically in the horizontal and vertical plane directions about a reference axis. In each line, a center LED has a pair of LEDs pointing in opposing angular directions from its center axis. The pulses emitted by each opposing pair are shifted opposite in phase, such that the phase angles of the resultant combined signals received at the receiver inversely correspond to the angular orientation of the pointer in the horizontal and vertical directions. However, this arrangement has the disadvantage that the multiplicity of LEDs and signal samples results in a bulky remote control unit and complexity of signal processing and conversion.

SUMMARY OF INVENTION

It is, therefore, a principal object of the invention as claimed herein to provide a simple electrooptical control device which permits remote control, such as by the position of a marker or cursor on the display screen, of an electronic apparatus in order to reduce the number of keys required to control multiple functions. It is a further object that the control device implement a pointing function wherein the angular orientation of the device relative to a reference axis can be reliably detected using only a minimum number cf signal-emitting sources.

In accordance with the invention, an electrooptical arrangement for remotely controlling an electronic apparatus with a remote control unit comprises:

a first radiation source in said remote control unit for emitting a first signal along a first optical axis thereof, said first signal having a radiation pattern in a first reference plane determined by said first optical axis and a first direction which has a monotonically rising/falling intensity characteristic in a first angular range including said first optical axis;

a second radiation source in said remote control unit for emitting a second signal along a second optical axis thereof, said second signal having a radiation pattern in a second reference plane determined by said second optical axis and a second direction which has a monotonically rising/falling intensity characteristic in a second angular range including said second optical axis;

a third radiation source in said remote control unit for emitting a third signal along a third optical axis thereof, said third signal having a radiation pattern which has a flat intensity characteristic in said first and said second angular ranges compared with the intensity characteristics of said first and second radiation sources, respectively;

wherein said first, second, and third optical axes of said first, second, and third radiation sources are aligned in parallel to each other; and a radiation detector linked with said electronic apparatus for detecting the received intensities of said first signal comparatively to said third signal in order to derive a first reference signal indicative of the angular orientation of said remote control unit relative to said radiation detector in said first angular range of said first reference plane, and for detecting the received intensities of said second signal comparatively to said third signal in order to derive a second reference signal indicative of the angular orientation of said remote control unit relative to said radiation detector in said second angular range of said second reference plane.

The position control in accordance with the invention is achieved by evaluating the relative angular positions of the remote control transmitter in different reference planes with respect to a reference line between the remote control transmitter and the electronic apparatus. By tilting the remote control transmitter, e.g. in the vertical or horizontal directions, a reference signal corresponding to the tilt angle in each respective direction is produced by an evaluating circuit contained in the electronic apparatus. A particular advantage is that the evaluation of the respective tilt angles also permits continuous control in the respective directions, which is desireable not only for functions such as volume adjustment, but also for producing graphics on the screen of a personal computer, for example. The combined evaluation of the two directions of tilting permits continuous motion control in and direction on the screen.

The fundamental idea of the electrooptical arrangement in accordance with the invention is that the transmitter is formed with three sources of radiation whose radiation patterns are different from each other and can be comparatively detected relative to each other to indicate the tilting of the transmitter in different spatial directions. The radiation detector receives different radiation intensities for the signals from the three sources depending upon the tilting of the remote control transmitter, and the relation between these signal intensities is evaluated to determine the tilt angles of the remote control transmitter.

The above objects and further features and advantages of the invention are described in detail below in conjunction with the drawings, of which:

BRIEF DESCRIPTION OF DRAWINGS

FIG. 2 is a schematic block diagram of an embodiment of a radiation detector and tilt evaluating circuit for the receiver of the electrooptical arrangement;

FIGS. 3a and 3b are schematic front and top views, respectively, of an embodiment of a transmitter having selectively placed diaphragms for generating the different radiation patterns of the radiation sources; and FIG. 4 is a schematic illustration of a leaf diaphragm structure for the different radiation patterns of the radiation sources.

DETAILED DESCRIPTION OF INVENTION

Figure 1A:
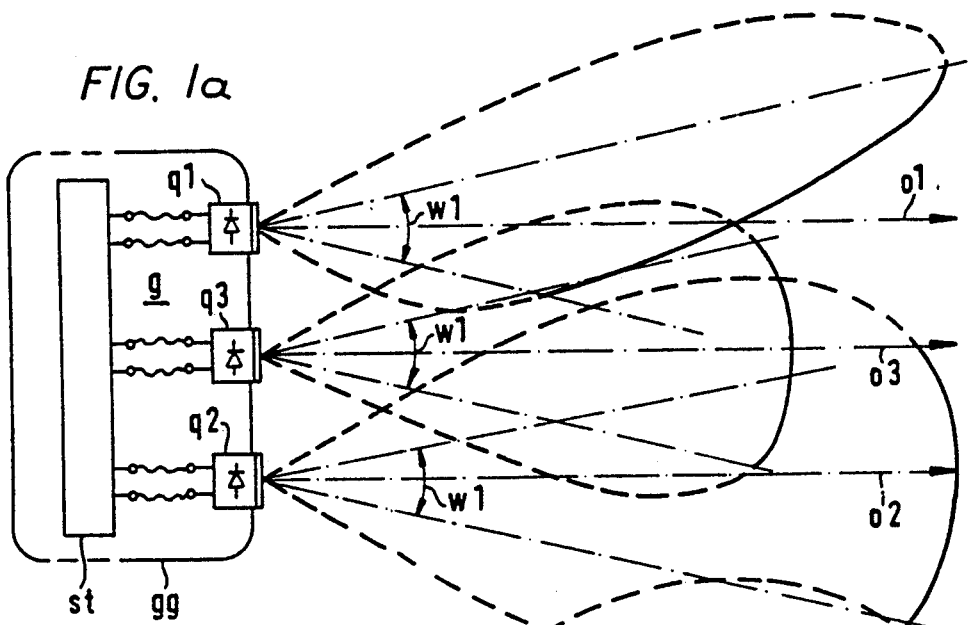
FIG. 1a is a schematic diagram of the underlying principle of the invention showing the radiation patterns of three radiation sources in a remote control transmitter in one reference plane direction.
Figure 1B:
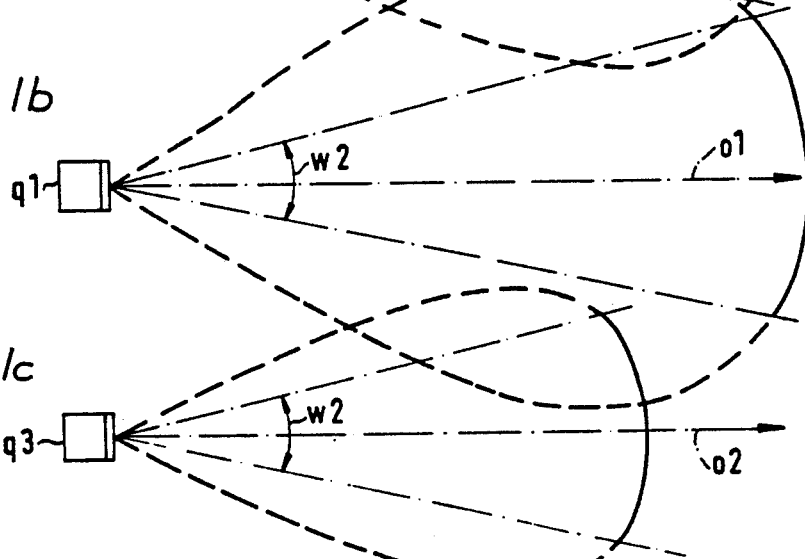
FIGS. 1b to 1d are schematic diagrams showing the radiation patterns of the three radiation sources in another reference plane direction.
Figure 1C:
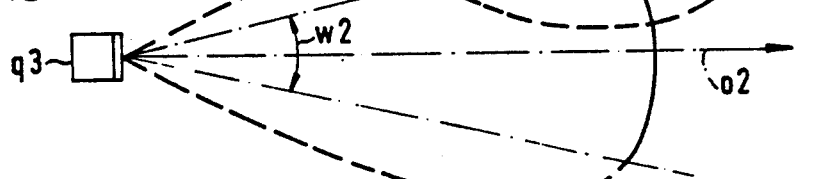
Figure 1D:
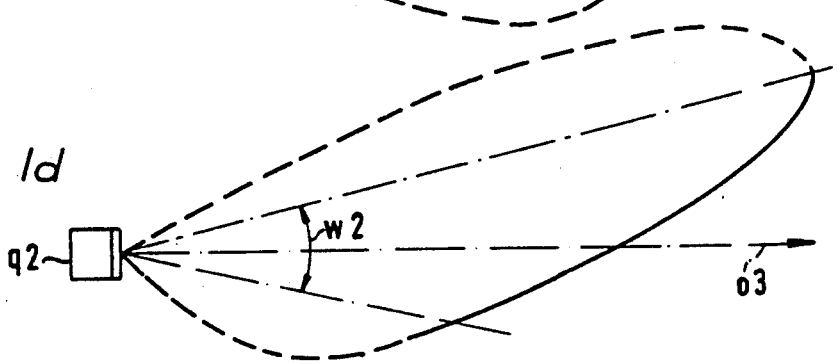

In FIG. 1a, the three radiation patterns of the three radiation sources q1, q2, q3 in the remote control transmitter g are shown from one view, which is taken in this example as the top view of the transmitter showing the radiation patterns in the horizontal plane direction. FIGS. 1b to 1d show the three radiation patterns in a different spatial direction, which is taken in this example as the side view of the transmitter showing the radiation patterns in the vertical plane direction. The radiation patterns are indicated by dashed lines, while their essential intensity characteristics in each plane direction are set off by solid lines.

The three radiation sources q1, q2, q3 are driven by a drive unit st, which drives the three radiation sources with closely spaced pulses in a time-division multiplex mode, for example, and inserts a prolonged space as an identification signal after every third pulse. The three radiation sources are at a front side of the remote control transmitter housing gg, and the three optical axes o1, o2, o3 of the respective radiation sources are parallel to the longitudinal axis of the housing.

The remote control transmitter g, like conventional remote control transmitters, may, of course, contain a keyboard with a coding circuit which produces, via additional electronic circuits, a coded signal which is radiated via an infrared-emitting diode. The radiation source q3, for example, would also be suitable for this purpose because it has a uniform radiation pattern. By the keyboard or special keys on the remote control transmitter g, the user can set the menu mode, for example, on a display of the electronic apparatus to be controlled, for selection of a control command for a function to be performed.

The radiation pattern of the first radiation source q1 has, in the horizontal reference plane in the direction of the optical axis o1 of the source, a widely varying (monotonically rising/falling) intensity characteristic in a first angular range w1. The radiation patterns of the second and third radiation sources q2, q3 do not have this varying pattern, but rather have a flat or uniform intensity characteristic across the angular range w1 with respect to the horizontal reference plane. Thus, if the transmitter with the first radiation source q1 is angled leftward or rightward in the first angular range w1, its intensity, as detected by a detector at which the remote control transmitter is pointed, will decrease or increase, respectively.

It should be noted that the radiation patterns are shown as projections. In the representation of FIGS. 1a to 1d, the radiation patterns all have about the same intensity value at the intersection with their optical axes. However, this is not a requirement of the invention.

FIGS. 1b to 1d show the vertical projection of the radiation patterns of the three radiation sources q1, q3, q2 in the direction of the optical axes o1, o3, o2 in a second angular range w2 with respect to the vertical reference plane. The radiation patterns of the first and third radiation sources q1, q3 have a flat intensity characteristic in the second angular range w2 in the vertical reference plane, while the radiation pattern of the second radiation source q2 has a widely varying (monotonically rising/falling) intensity characteristic. Thus, if the transmitter with the second radiation source q2 is tilted upward or downward in the second angular range W2, its intensity, as detected by a detector at which the remote control transmitter is pointed, will decrease or increase, respectively.

FIG. 2 shows a simple embodiment of a detector and evaluating circuit at the receiving side of the electrooptical arrangement. The radiation detector p serves to receive the radiation emitted by the three radiation sources q1, q2, q3. It is typically located at the front side of an electronic apparatus eg and contains, for example, an infrared-receiving diode whose output is amplified by means of a variable gain amplifier v and coupled through an interference suppression filter f to a decoding circuit cd. The latter separates the received multiplexed signal into the three component signals k1, k2, and k3 which correspond to the signals received from the first, second, and third radiation sources q1, q2, and q3, respectively.

The three component signals k1, k2, k3 are fed to an evaluating circuit aw, which produces reference signals z1 and z2 corresponding to the angles of tilt of the transmitter in the horizontal and vertical reference planes, respectively. The evaluating circuit aw shown in FIG. 2 is designed to have a particularly simple construction. It derives a first difference signal d1 from the first and third component signals k1 and k3 by means of a first subtractor sb1, and a second difference signal d2 from the second and third component signals k2 and k3 by means of a second subtractor sb2.

In the subtractors sb1, sb2, the strongly angle-dependent intensity characteristics of the radiation patterns of the first and second radiation sources q1 and q2, respectively, are thus compared with the relatively angle-independent radiation pattern of the third radiation source q3. Since the absolute intensity is very strongly dependent on the distance of the remote control transmitter g from the electronic apparatus eg, the two difference signals d1, d2 must be normalized. This is done by the first and second normalizing circuits g1 and g2, which divide the first and second difference signals d1 and d2, respectively, by the value of the third component signal k3, thus providing at their outputs the first and second reference signals z1 and z2, respectively. The respective values of the two reference signals are thus approximately proportional to the respective tilt angles.

The variable gain amplifier v also partially compensates for the distance-dependent intensity variation. A control signal is derived from the third component signal k3, which is low-pass filtered via the control stage cs. The variable gain amplifier v is particularly necessary if the decoding circuit cd and the evaluating circuit aw are designed as digital circuits. Without the variable gain amplifier v, at greater distances the resolution of the analog-to-digital converter c1 could become too low due to the small signal amplitude if only a few quantization levels are involved. If the signals are processed digitally, the control input of the variable gain amplifier v is driven via the digital-to-analog converter c2.

The analog-to-digital converter c1 permits the decoding circuit cd and the evaluating circuit aw in the electronic apparatus eg to be implemented with a microprocessor P, which is loaded with a program having the same effect as the decoding circuit cd and the evaluating circuit aw. For the transmitter angular position determination, use can be made of a microprocessor already present in the electronic apparatus eg, because the processes to be calculated are relatively slow and can thus be easily inserted into another program.

The radiation patterns of the three radiation sources q1, q2, q3 shown in FIG. 1 can be produced in various ways. In a particularly simple embodiment shown in FIGS. 3a and 3b, at least the first and second radiation sources q1 and q2 are line or area sources each of which has, in the direction of its optical axis o1, o2 and at a given distance from its radiating surface, a diaphragm b1, b2 which covers a part of the respective radiation source q1, q2. The effective edges of the diaphragms b1, b2 have a spatial orientation perpendicular to the directions of the first and second reference planes. As mentioned above, the first and second reference planes are determined by the optical axes o1 and o2 and the respective plane directions for the ranges of tilt angles, namely the first and second angular ranges w1 and w2, respectively. Thus, the radiation intensities of the sources q1, q2 are made to vary in the directions of the corresponding angular ranges of tilt angles simply by covering their radiating surfaces with the diaphragms b1, b2 in different directions. It is also necessary that the intensity characteristic of the other of the radiation sources in a given one of the angular ranges should be as symmetrical and as flat as possible in order to avoid cross-talk with the radiation source whose pattern is varied in the given angular range.

The surface finishes of the three radiation sources may be accomplished in various ways. They can be frosted surfaces, e.g., pure cosine radiators, or surfaces which concentrate the beams in the direction of the optical axis so as to extend the remote control limit through a higher range of intensities.

In the preferred embodiment of FIG. 3a, the radiation sources q1, q2, q3 have square radiating surfaces. The diaphragm b1 covers the left-hand half of the first radiation source q1 in order to produce a radiation pattern varying in the horizontal reference plane, while the radiation pattern of the other source q2 does not. Complementarily, the diaphragm b2 covers the lower half of the second radiation source q2 in order to provide a radiation pattern varying in the vertical reference plane, while the radiation pattern of the other source q1 does not. FIG. 3b shows the front side of the remote control transmitter g in a top view, in which the left-hand half of the radiation source q1 is covered by the first diaphragm b1, while the edge (in sectional view) of the second diaphragm b2 extends across the front of the radiation source q2. The distance at which the diaphragms are located in front of the respective radiating surfaces depends on the required angular sensitivity of the remote control transmitter.

The square shape of the radiating surfaces is particularly advantageous because it permits the horizontal and vertical directions of tilting to be separated in a very simple manner if the edges of the squares and the edges of the diaphragms are oriented in these directions.

FIG. 4 shows another embodiment of the diaphragms consisting of leaves 11 which are inclined to the optical axis oi at a fixed angle w3. The angle of inclination w3 is set to lie outside of the angular ranges w1, w2 so that the direction in which a maximum amount of light is passed or blocked by the leaves 11 also lies outside of the angular ranges w1, w2. The leaf diaphragms can be combined with surfaces of arbitrary line or area sources of radiation qi, but are particularly advantageously with square radiating surfaces. The advantage of the leaf diaphragms resides in the fact that their angular sensitivity is considerably better than that of the simple diaphragms. The shorter the spacing between the parallel leaves, the greater the sensitivity for the same leaf shape.

The radiation patterns shown in FIGS. 1a to 1d can also be produced by optical means which are contained in the surfaces of or within the respective radiation sources. Suitable optical means include conventional optical forms, such as prisms and lenses, wherein the lenses can be cylindrical, spherical, or aspherical. Combinations of two or more basic forms or a fine structure, such as a Fresnel lens, are also possible. It is also sufficient, for example, to use a simple prism which deviates the radiation lobe from the original optical axis to generate the required rising/falling intensity characteristic in the angular range about the optical axis. A correspondingly oblique mounting position of the radiation source could also provide the same effect.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

I claim:

1. An electrooptical arrangement for remotely controlling an electronic apparatus with a remote control unit comprising:
   a first radiation source in said remote control unit for emitting a first signal along a first optical axis thereof, said first signal having a radiation pattern in a first reference plane determined by said first optical axis and a first direction which has a monotonically rising/falling intensity characteristic in a first angular range including said first optical axis;
   a second radiation source in said remote control unit for emitting a second signal along a second optical axis thereof, said second signal having a radiation pattern in a second reference plane determined by said second optical axis and a second direction which has a monotonically rising/falling intensity characteristic in a second angular range including said second optical axis;
   a third radiation source in said remote control unit for emitting a third signal along a third optical axis thereof, said third signal having a radiation pattern which has a flat intensity characteristic in said first and said second angular ranges compared with the intensity characteristics of said first and second radiation sources, respectively;
   wherein said first, second, and third optical axes of said first, second, and third radiation sources are aligned in parallel to each other; and
   a radiation detector linked with said electronic apparatus for detecting the received intensities of said first signal comparatively to said third signal in order to derive a first reference signal indicative of the angular orientation of said remote control unit relative to said radiation detector in said first angular range of said first reference plane, and for detecting the received intensities of said second signal comparatively to said third signal in order to derive a second reference signal indicative of the angular orientation of said remote control unit relative to said radiation detector in said second angular range of said second reference plane.

2. An electrooptical arrangement according to claim 1, further comprising an electronic drive circuit which drives the three radiation sources to generate corresponding time-division multiplexed signals, and a decoding circuit which separates the output signal of said radiation detector into the first, second, and third component signals representing the detected intensities of the transmitted first, second, and third signals, respectively, and feeds them to an evaluating circuit.

3. An electrooptical arrangement according to claim 2, wherein said evaluating circuit includes a first subtractor for deriving a first difference signal from the first and third component signals, a second subtractor for deriving a second difference signal from the second and third component signals, and a normalizing circuit for dividing the first and second difference signals by the value of the third component signal in order to derive said first and second reference signals, respectively.

4. An electrooptical arrangement according to claim 2, wherein a variable gain amplifier is interposed between said radiation detector and said decoding circuit and is controlled in response to the third component signal fed back thereto through a control stage.

5. An electrooptical arrangement according to claim 2, wherein said decoding and evaluating circuits are structured to process digital signals, and further comprising an analog-to-digital converter for converting the signals detected by said radiation detector to digital signals which are supplied to said decoding and evaluating circuits.

6. An electrooptical arrangement according to claim 5, wherein said decoding and evaluating circuits are implemented with a microproccesor which is loaded with a program for carrying out their respective functions.

7. An electrooptical arrangement according to claim 1, wherein said first and second radiation sources are line or area sources each of which has, in the direction of its optical axis and at a given distance from its radiating surface, a diaphragm which covers a part of the respective radiating surface, wherein said diaphragm for a respective one of the radiation sources has an effective edge with a spatial orientation perpendicular to the direction of the respective reference plane in order to vary the intensity of its radiation pattern in the direction of said reference plane, and wherein the intensity characteristic of the other of the radiation sources is symmetrical and flat with respect to said reference plane.

8. An electrooptical arrangement according to claim 7, wherein the three radiation sources have square radiating surfaces and square sides which are respectively parallel or perpendicular to the first and second reference plane directions, and each diaphragm for a respective one of the first and second radiation sources has an effective edge which is straight and extends in a direction perpendicular to the direction of the respective reference plane.

9. An electrooptical arrangement according to claim 7, wherein the diaphragms are comprised of parallel leaves which are inclined at an angle to the optical axes of the respective radiation sources selected so as to block signals from being radiated in the respective angular ranges.

10. An electrooptical arrangement according to claim 1, wherein the three radiation sources have optically active surfaces which direct light emitted therefrom in accordance with the desired radiation patterns.

11. An electrooptical arrangement according to claim 10, wherein said optically active surfaces are formed by prisms or by cylindrical, spherical, or aspherical lenses.

* * * * *